UNITED STATES PATENT OFFICE.

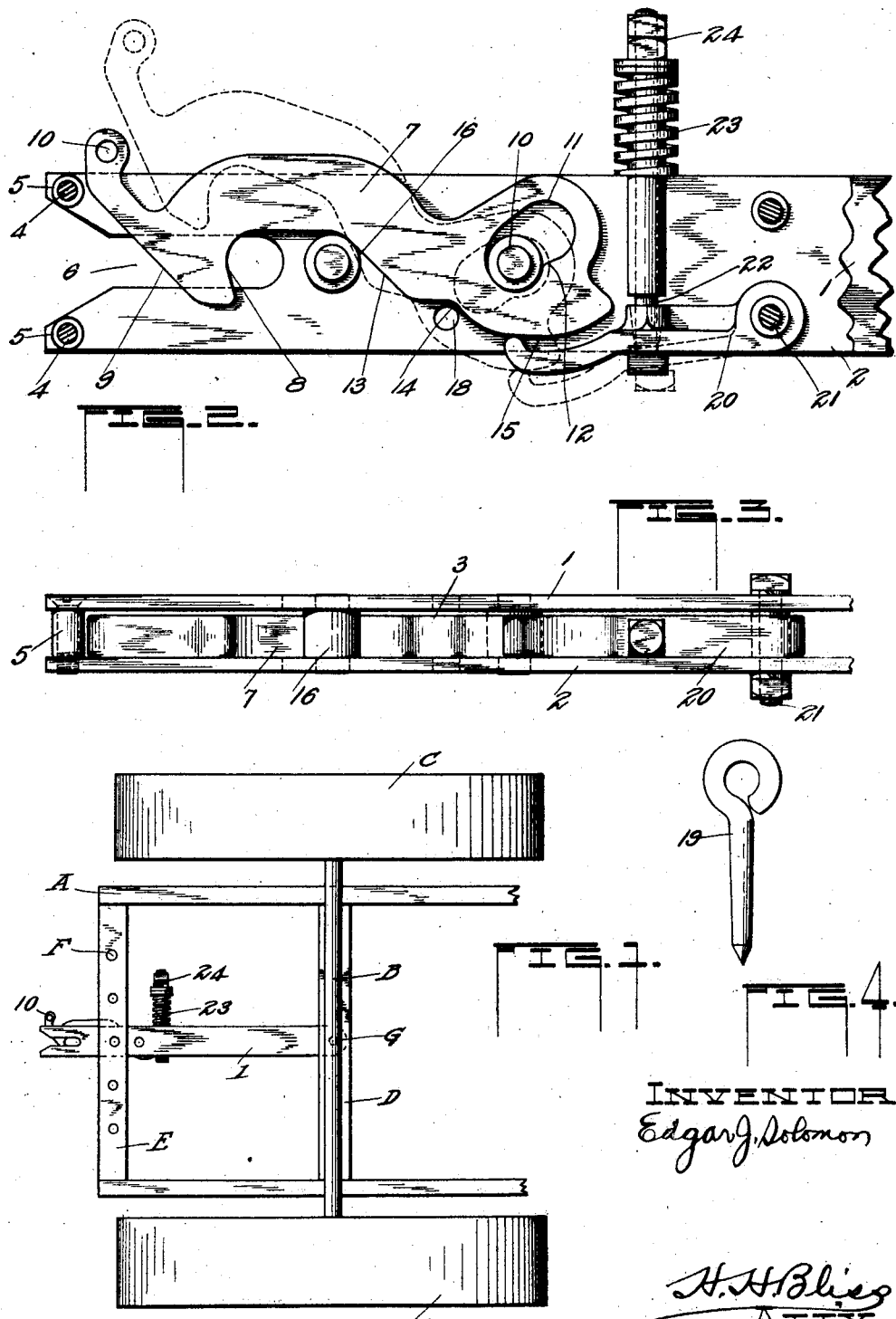

EDGAR J. SOLOMON, OF PEORIA, ILLINOIS, ASSIGNOR TO AVERY COMPANY, OF PEORIA, ILLINOIS, A CORPORATION OF ILLINOIS.

AUTOMATIC RELEASING-COUPLING.

1,391,422. Specification of Letters Patent. Patented Sept. 20, 1921.

Application filed January 25, 1919. Serial No. 273,103.

*To all whom it may concern:*

Be it known that I, EDGAR J. SOLOMON, a citizen of the United States, a resident of Peoria, in the county of Peoria and State of Illinois, have invented new and useful Improvements in Automatic Releasing-Couplings, of which the following is a specification.

This invention has reference to couplers, and relates more particularly to an automatic releasing coupler for use in attaching a farm implement to a tractor.

The invention has for its principal object, to provide a coupler for attaching an implement to a tractor, which embodies in its structures, means for automatically uncoupling the coupler to release the implement from the tractor when the pressure is such that breakage of the implements, or parts thereof is obvious.

In the art of couplers for attaching farm implements to tractors, so far as I am aware, the couplers have been of such a construction, that when an obstacle is encountered by the ground engaging elements of the implement, such as to retard the forward movement of the implement, the pull exerted by the tractor is such, that unless the coupler gives, as is not often the case, the implement must and, therefore, breakage of the ground engaging elements results. My invention obviates this difficulty, and the coupler is so constructed that the coupling element is yieldingly held in operative position, until the pressure reaches a point which is greater than the pressure exerted by the means for yieldingly holding the coupling element, when said yielding means may be automatically released to permit the implement to become detached from the tractor, and breakage thereby obviated.

That the invention may be more fully understood, reference is had to the accompanying drawings, forming a part of the present description, in which:

Figure 1 is a partial top plan view of the rear platform of a tractor, showing my improved coupling mechanism applied thereto;

Fig. 2 is a top plan view of the coupler proper, with a covering plate removed and the coupling element shown in different positions;

Fig. 3 is a side elevation of Fig. 2, and

Fig. 4 shows a pin for changing the coupling from an automatic releasing coupler to a non-yielding coupling.

Like characters of reference denote corresponding parts throughout the figures.

In a rather diagrammatic way, in Fig. 1, I show the rear platform of a tractor, the same comprising the frame A, the axle B, ground wheels C, and the cross-bars D and E of the frame, the latter being provided with the spaced holes F, for purposes to be explained.

The coupler proper comprises a draw-bar, including a pair of elongated plates or bars 1 and 2, the same being spaced apart only a sufficient distance to permit working therebetween, preferably the cast steel latch 3 and said plates or bars 1 and 2 are held together by the bolts 4, surrounded by the spacing sleeves 5. The forward ends of the plates 1 and 2 are each provided with the similarly shaped slots 6, leading thereinto from the ends, and so arranged to permit a link or equivalent device, not shown, attached to the implement to enter the same, when the tractor is backed up to the implement, and be engaged by the coupler element for attaching the implement to the tractor.

The coupler element is preferably, a cast steel latch, designated 7 and preferably having the shape seen in Fig. 2. The latch, as shown, has the hook 8 and an inclined front wall 9, terminating in an eye 10 to which may be connected any suitable element by means of which an operator may manually release the element 7. Normally the hook 8 of the element 7 lies across the slots 6 in the bars or plates 1 and 2, and therebetween, as seen in Fig. 3. The element 7 has a pivotal relation with a roller bearing 10 entering and operating in a slot 11, in said element 7, and adapted to roll on the cam-shaped wall 12 of said slot. The hook 8 of the element 7 merges into a wall of the said element which is slanting as at 13, formed with a shoulder, as at 14 and terminating in the cam-like wall 15. The slanting wall portion 13 of the element is adapted to ride against the roller bearing 16, and the shoulder 14 normally lies adjacent alined openings 18 in the plates 1 and 2 which are provided to receive a pin 19, Fig. 4. The cam-like wall 15 of the element 7 is adapted to ride against the end of a lever 20 fulcrumed on a pin 21 secured in the plates 1 and 2 and to said lever is coupled a stem 22 disposed transversely to a line drawn longitudinally of the plates or bars 1 and 2 and on said stem is a compression spring 23 which bears between one edge wall of the plates or bars 1 and 2 and a disk or plate on the end of the stem held in place by the nuts 24 which may be employed to compress and store power in the spring 23.

In Fig. 1 the inner ends of the bars 1 and 2 are shown coupled at G to the cross-bar D of the frame, preferably coincident with the axle B, although this point may be moved forward, if it is deemed desirable. The coupling end of the bars 1 and 2 project out and beyond the rear cross-bar E of the frame, preferably in manner seen in Fig. 1, and if side draft is to be obviated, the bars 1 and 2 may be thrown over at an angle and held by a coupling pin passed through any one of the holes F, in said rear cross-bar E, as will be understood.

Assuming the parts of the coupler to be in the position shown in full lines, in Fig. 2, as the tractor is backed up to an implement, the coupling link or equivalent device, not shown, will enter the slots 6, ride under the hooked end 8 of coupler element 7 which will couple the link to the drawbar. Assuming also that as the tractor draws the implement over the field, the ground engaging elements of the implement engage obstructions which they cannot surmount. Ordinarily, if the coupler cannot release itself, and before the operator can discover the danger, his implement becomes damaged. With my device, however, the pull will continue until the pressure reaches a point which is greater than the pressure exerted by the spring 23, when the coupler element 7 releases itself from the coupling member on the implement, permitting the tractor to pull away from the implement without damage. This is accomplished as follows: As the pressure on the hooked end 8 of the coupler element 7 increases, the inclined wall 13 will ride up on the roller bearing 16, as shown in dotted lines Fig. 2, causing the cam-like wall 15 to force the lever 20 outwardly against the tension in the spring 23. This throw is permitted by the peculiar shape of the wall 12 of the slot 11 which rides on the roller bearing 10. Instantly, upon the pressure being released from the hooked ends 8 the spring will pull the lever 20 back into its normal position and it will force the coupler element 7 into its normal position, shown in full lines, Fig. 2.

Using the holes 18 in the draw-bar, and inserting the pin 19 therethrough, the operator provides a permanent lock for the coupler element 7, and prevents the automatic uncoupling thereof. This may be used under certain working conditions, whenever desirable.

What I claim is:

1. In a coupler of the character described, in combination, a draw-bar having a longitudinal slot leading thereinto from one end, a coupler element fulcrumed on said draw-bar and having a hooked-end normally lying across the slot in said bar, and means for yieldingly holding said coupler element, in its operative position and capable of giving under extreme pressure to permit the coupler element to automatically disengage itself from a member coupled thereto, and to automatically return immediately thereafter to its normal position.

2. In a coupler of the character described, in combination, a draw-bar having a slotted end, a coupler element fulcrumed on said bar, the fulcrum point on said element adapted to change under varying conditions of load, a hook on the end of said element normally lying across the slot in said bar, a bearing member on said bar on which the coupler element will ride under varying conditions of load, and means for yieldingly holding said coupler element in its operative position and capable of giving under extreme pressure to permit the coupler element to automatically disengage itself from a member coupled thereto.

3. In a coupler of the character described, in combination, a draw-bar having a longitudinal slot leading thereinto from one end, a coupler element fulcrumed on said draw-bar and having a hooked-end normally lying across the slot in said bar, a lever fulcrumed on said bar, its free end bearing against said coupler element at points remote from said hooked-end, and means for yieldingly holding said lever against said coupler element.

4. In a coupler of the character described, in combination, a draw-bar having a longitudinal slot leading thereinto from one end, a coupler element fulcrumed on said draw-bar and having a hooked-end normally lying across the slot in said bar, the fulcrum for said element including a slotted opening in the element with a cam-like wall, and a roller bearing on said bar operating in said slotted opening, one wall of said element having an inclined portion merging into a shoulder, and terminating in a cam-like surface, a roller bearing on the bar on which the inclined portion of the element may ride, a lever fulcrumed in said bar and bearing against said cam-like surface on said element, and means for yieldingly holding the lever in operative engagement with said element.

5. In a coupler of the character described, in combination, a draw-bar having a longitudinal recess in one end thereof, a coupler bar movable bodily longitudinally and laterally and having a hooked-end normally lying across the recess in said bar, means to hold the coupler bar in predetermined paths during movement including a yielding device normally pressing laterally upon said coupler bar.

6. In a coupler of the character described, in combination, a draw-bar having a longitudinal recess in one end thereof, a coupler bar slidable bodily longitudinally and laterally, fixed guides on the draw-bar, one to move the front end and the other to move the rear end through predetermined lateral paths, and an adjustable yielding pressure device normally bearing laterally against the inner end of said coupler bar.

7. In a coupler of the character described, in combination, a draw-bar having a longitudinal recess in one end thereof, a coupler bar having a hook at one end, a slot adapted to receive a guide at the other end, and an intermediate cam shoulder, and means on the draw-bar adapted to engage with said cam shoulder and guide slot to compel the coupler bar to move through predetermined paths, and a lateral pressure device normally bearing against one end of said coupler bar.

In witness whereof, I have hereunto affixed my hand and seal this 20th day of January, 1919.

EDGAR J. SOLOMON. [L. S.]